Feb. 18, 1969   J. STAR   3,427,769

ERECTING MECHANISM

Filed July 26, 1966

INVENTOR.
JOSEPH STAR

BY
Brumbaugh, Free, Graves & Donohue his   ATTORNEYS

United States Patent Office 3,427,769
Patented Feb. 18, 1969

3,427,769
ERECTING MECHANISM
Joseph Star, Roslyn Heights, N.Y., assignor to Lundy Electronics & Systems, Inc., Glen Head, N.Y., a corporation of New York
Filed July 26, 1966, Ser. No. 568,043
U.S. Cl. 52—113        6 Claims
Int. Cl. E04h 12/34; H01q 1/08

ABSTRACT OF THE DISCLOSURE

As described herein, an erecting mechanism is provided which comprises a plurality of joints, each joint possessing a controlled breakaway characteristic and including two elements having profile matching complementary surfaces which inhibit relative pivotal movement therebetween to retain the elements in a relatively fixed cooperative relation. The elements cooperatively mate together when actuated by a motive force. In one embodiment, the joint comprises a tapered plug and a profile matching socket and the motive force includes a spring biased flexible cable. The strength of the joint and its inherent breakaway characteristic are controlled by suitably selecting the mating configurations of the plug and socket and the biasing of the flexible cable.

---

This invention relates to erecting mechanisms and, more particularly, to devices which automatically assemble antenna masts, probes, structural members and the like into erect positions.

In many instances, it is often desirable to maintain antenna masts, probes and other such devices which consist of one or more elements unassembled and stowed until ready for use. Furthermore, once the device has been assembled and served its purpose, such as for example, as a source of electrical data, it is often necessary to break or shear the device by the application of a predetermined lateral or longitudinal force. In the past, the assemblage of such devices from a stowed condition has been accomplished manually or mechanically, the procedure for both operations being both complex and time-consuming. The breakage of the devices has been equally as difficult, requiring for example, vertical or horizontal forces which not only shear the device but which also caused irreparable damage to the base employed to support the device.

In accordance with the invention an erecting mechanism is provided which consists of one or more joints, each joint possessing a predictable breakaway characteristic and including two elements having profile matching complementary surfaces at least a portion of which inhibit relative pivotal movement of the elements. The elements cooperatively mate together when actuated by a motive force. In one embodiment of the invention, the joint comprises a tapered plug and a profile matching socket which form a probe for electrical testing purposes when assembled and the motive force includes a spring biased flexible cable. The strength of the joint and its inherent breakaway characteristic are controlled by preselection of the mating configurations of the plug and socket and the biasing of the flexible cable.

For a more complete understanding of the invention, reference may be had to the following detailed description of the invention taken in conjunction with the figures of the following drawing, in which.

Figure 1:
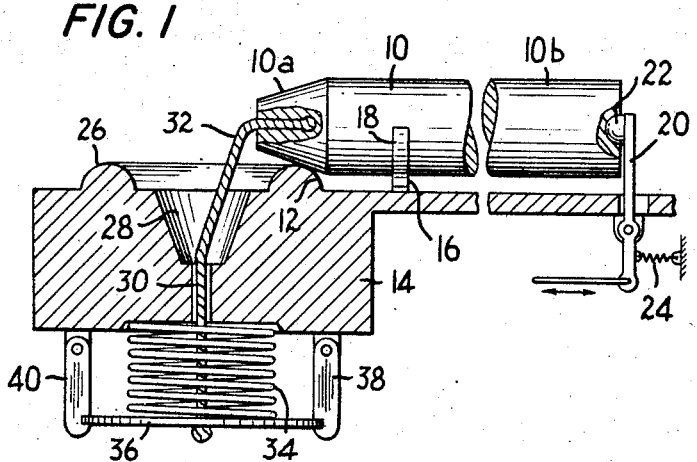
FIGURE 1 is a view in section of an illustrative embodiment of the unassembled erecting mechanism of the invention.

Referring now to FIG. 1, a representative erecting mechanism according to the instant invention comprises a plug 10 having a first portion 10a, of generally truncated conical cross-section and a second portion 10b, of generally cylindrical cross-section, maintained in its unerect and stowed position against a camming surface 12 of a casing 14. The plug 10 may be secured in a stowed position in any number of conventional ways. For example, the plug 10 is shown as being secured against longitudinal movement by a suitable shoe or pin 16 of any appropriate configuration which engages a matching slot 18 in the plug 10, and against pivotal movement by a pivotably mounted spring biased latching arm 20 which engages a matching detent 22 in the plug 10. Prior to or concurrent with the assembly of the mechanism, the latching arm 20 is removed from its engaging position with the plug 10 by the application of lateral force which is greater than and opposite to the force exerted against the arm 20 by the spring 24. This action may be accomplished manually or electro-mechanically, such as for example, by the operation of a solenoid.

The casing comprises the camming surface 12, a second camming surface 26, a profile socket 28 which complements the shape of the portion 10a of the plug 10 and a channel 30 which extends downwardly from the socket 28 to the bottom portion of the casing 14. Further included is a flexible cable 32 which is threaded through the channel 30 and a spring 34 and terminated on opposite ends by the plug 10 and the diaphragm 36 of the spring 34. The spring 34 is maintained in a compressed state by means of a pair of latching arms 38 and 40 which engage the diaphragm 36 in a locking relationship. As in the case of latching arm 20, the arms 38 and 40 may be controlled manually or electro-mechanically, such as for example, by the operation of a solenoid. If the assembled plug 10 and a socket 28 are to take on the characteristics of probes, antenna masts and the like, the cable 32 may comprise a suitably strengthened electrical cable or a stranded steel cable of conventional construction.

The assemblage of the joint into an erect position is accomplished by the sequential operation of the latching arm 20 and the latching arms 38 annd 40 or by simultaneously impulsing latching arm 20 and latching arms 38 and 40 for a short period of time. This action causes the spring 34 to expand, the expanding spring 34 in turn drawing the cable 32 into the socket 28 and through the channel 30. An erecting torque is applied to the plug 10 which rotates the plug 10 towards a position of alignment with the socket 28 and away from its engagement with the pin 16. As the plug 10 and socket 28 approach colinearity, the cable tension draws the plug 10 into the socket 28, seating it securely.

As will be described hereinbelow, the strength of the joint formed by the mating of the plug 10 and the socket 28 to lateral or oblique forces is dependent upon the relative configurations of the plug 10 and the socket 28 and the tension placed on the cable 32 by the spring 34. For a stronger joint, the spring 34 possesses a large spring constant and/or does not reach the full breadth of the expansion when the plug 10 is firmly seated in the socket 28. For a weaker joint, the spring 34 has a small spring constant and/or reaches the full breadth of its expansion when the plug is firmly seated in the socket 28.

While the spring 34 and the latching arms 38 and 40 have been shown outside the casing 14, it should be understood that the same result as the one described above may be achieved by placing the spring 34 and the latching arms 38 and 40 within the casing 14, directly below the socket 28.

Figure 2:
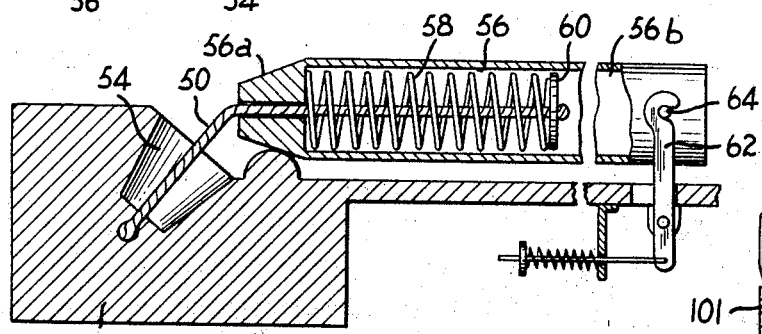
FIG. 2 is a view in section of another embodiment of the unassembled erecting mechanism of the invention.

Moreover, the same result is achieved by an erecting mechanism of the type illustrated in FIG. 2 wherein a flexible cable 50, terminated at one end by a casing 52, passes from the casing 52 through an angled socket 54 situated within the casing 52. The cable 50 is further threaded through the conical first portion 56a of a plug 56 and through a spring 58 located within the generally cylindrical second portion 56b of the plug 56 and is terminated at its other end by the diaphragm 60 of the spring 58. A spring biased, pivotably mounted latching or control arm 62 is further included within the mechanism for engaging a pin 64 which extends through the plug 56 and for retaining the plug 56 in its stowed condition. In this embodiment, the arm 62 acts against the plug 56 rather than directly controlling the spring 58.

In this embodiment, the assemblage of the joint to an oblique position is effected by releasing the arm 62 either electro-mechanically or manually and allowing the spring 58 to expand. The expanding spring pulls the cable 50 through the plug 56 and causes the plug 56 to rotate toward a position of alignment with the angled socket 54. Finally, the plug 50 is tightly secured within the angled socket 54, the strength of the joint to lateral and vertical forces being dependent upon the tension exerted upon the cable 50 by the spring 58 and the relative configurations of the plug 56 and angled socket 54. It is obvious that a force applied along the major axis of the plug 56 will not have a tendency to unseat the joint.

Figure 3:
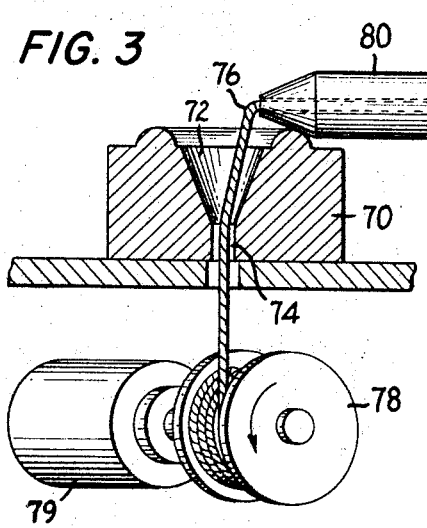
FIG. 3 is a view in section of still another embodiment of the unassembled erecting mechanism of the invention.

According to another embodiment of the invention, as illustrated in FIG. 3, an erecting mechanism is provided for accomplishing the erection of an unassembled probe, antenna or similar device which consists of more than one joint or section. To this end, the mechanism comprises a casing 70 which includes a profile matching socket 72 situated in the top portion thereof and a channel 74 which extends downwardly from the socket 72 to the bottom portion of the casing 70. A flexible cable 76 is terminated at one end by a winch 78 which is driven by a motor 79 and passes from the winch 78 through the channel 74 and the socket 72. From the socket 72, the cable 76 is further threaded through a tapered plug 80, a matching profile socket 82 situated within the second portion 80a of the plug 80 and to a second tapered plug 84 at which point it is terminated at its other end. The probe, therefore, consists of two sections. The first section comprising the plug 84 and socket 82 and the second section comprising the plug 80 and socket 72.

In order to accomplish erection of the two-section probe, the winch 78 is actuated by the motor 79 and rotates in the counterclockwise direction, as indicated. This action serves to take up the cable 76, pulling it through both sections of the probe. Initially, the plug 84 is pulled towards a position of alignment with the socket 82 and secured thereto. As the winch continues to rotate, the plug 80 and the mating first section are rotated together towards the socket 72 until the plug 80 and socket 72 become fixed in a cooperative relation. Although the plug 84 and socket 82 are brought together in the horizontal plane, it is not until the erection of the complete probe will there be effected a strong joint between these two elements. This follows since the cable tension increases as the winch 78 continues to rotate.

It should be understood that although the probe has been shown in FIG. 3 as consisting of two sections, the number of sections may be increased to meet the requirements of any system. The requirement for a multi-section probe is that the traverse of the cable 76 resulting from the rotation of the winch 78 should be sufficient to move all the plugs into their respective sockets.

Figure 4:
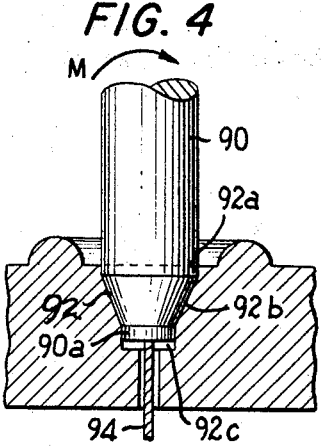
FIG. 4 is a view in section of an assembled mechanism possessing a high strength type joint.

Referring now to FIG. 4, there is illustrated a one-section probe, the plug 90 and socket 92 having been brought together by a cable 94 in accordance with the above-described principles of operation. The strength of the joint formed by the mating of the plug 90 and socket 92 to lateral and rotational forces may be predictably controlled by suitable shaping of these two elements and the tension placed on the cable 94 by the motive force (not shown). In this embodiment, the first portion 92a of the socket 92 possesses a generally cylindrical shape, the second part 92b possesses a generally truncated conical shape, and the third part 92c possesses a generally cylindrical shape. The shape of the plug 90 complements that of the socket 92, possessing however a cylindrical portion 90a which is shorter in length than the third portion 92c of the socket.

The arrangement of FIG. 4 provides a joint which is as strong as the material from which the plug 90 and socket 92 are constructed inasmuch as any overturning moment, as indicated by the arrow M, exerted on the extended portion of the plug 90 does not have a tendency to unseat the plug 90 from the socket 92. In response to the moment M, opposite moments are applied to the portions of the joint wherein the cylindrical sections of both the plug 90 and socket 92 mate which counteract the overturning moment M. It follows, therefore, that the joint will remain secure and erect until the moment M exceeds the shear strength of the plug 90.

Figure 5:
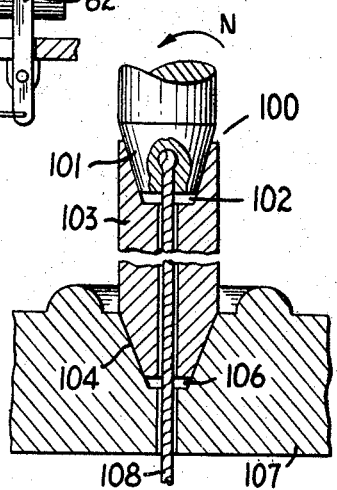
FIG. 5 is a view in section of a multi-joint mechanism possessing low strength type joints.

Referring now to FIG. 5, a multi-section probe is provided which includes a pair of so-called "break-away" joints or sections assembled in accordance with the principles of operation described above. A first joint 100 includes a tapered cylindrical plug 101 and a profile matching socket 102, the socket 102 being situated within a tapered cylindrical plug 103. The second joint 104 comprises the plug 103 and a profile matching socket 106 situated within a casing 107. As mentioned above, the strength of the joints 100 and 104 to lateral forces may be controlled by the suitable shaping of their respective plugs 101 and 103 and sockets 102 and 106 and by the selection of the tension placed on the erection cable 108 by the motive force (not shown).

As shown, the length of the tapered upper portion of the plug 101 is greater than the height of its respective matching socket 102 whereas the entire tapered portion of the plug 103 fits securely within the socket 106. In response to an overturning moment exerted on the plug 101, as shown by the arrow N, the joint 100 will break-away prior to the breakaway of the joint 104, the tension on both joints being equal. In the alternative, if the plug 103 had possessed a greater taper angle than the plug 101, and if the entire tapered portion of the plug 101 fitted securely within the socket 102, the joint 104 would break away from the joint 100 in response to the same overturning moment N.

From the foregoing, it can be seen that by proper selection of the taper angle of the plug, the depth and angle of the socket to which the plug is affixed and the tension exerted on the joint by the erection cable, the breakaway characteristics of the joint may be controlled. This feature has particular applicability in areas where it is often necessary that the probe break when subjected to a predetermined force applied either vertically or horizontally against it.

It should be understood that the above-described embodiments of the present invention are illustrative only and that the invention is susceptible of considerable modification. For example, each section of a multi-section probe may be designed for individual controlled breakaways under longitudinal as well as side loads. Combinations of strong and weak joints can be provided for predictable rotations at various positions under stipulated loads. The actuating cable itself may serve other purposes, such as an electrical conductor or as a continuation of some other mechanism used for hoisting and moving operations. The interconnected elements of the probe may be in a straight line relation or intentionally dog-legged to permit a predictable failure. Accordingly, all such modifications and variations within the skill of the art are included within the spirit and intended scope of the invention as defined by the following claims.

I claim:
1. An erecting mechanism, comprising at least one joint having a controlled breakaway characteristic, said joint comprising a base member having an opening of substantial depth with an inwardly tapering surface formed therein, a plug member having a generally cylindrically shaped main body portion and a terminal portion, the terminal portion having an inwardly tapering surface extending from the periphery of the main body portion for engaging the inwardly tapering surface of the opening formed in the base member in a frictional locking relationship and motive means including connector means for drawing together the base member and the plug member into the frictional locking relationship and biasing means for biasing the connector means.

2. An erecting mechanism according to claim 1 wherein the base member includes means for supporting the plug member in a stowed position with the terminal portion of the plug out of engagement with the opening formed in the base member and further comprising latch means engaging the plug member for securing the plug member against pivotal movement while the plug is supported in the stowed position.

3. An erecting mechanism according to claim 2 wherein the biasing means comprises a spring means mounted in the base member and further comprising control means for disengaging the latch means from the plug member and for actuating the spring means to thereby allow said spring means to expand and to cause the connector means to draw together the plug member and the base member by rotating the plug member from its stowed position toward a position of colinearity with the base member.

4. An erecting mechanism according to claim 2 wherein the biasing means comprises a spring means mounted in the plug member and further comprising control means for disengaging the latch means from the plug member and for actuating the spring means to thereby allow said spring means to expand and to cause the connector means to draw together the plug member and the base member by rotating the plug member from its stowed position toward a position of colinearity with the base member.

5. An erecting mecahnism according to claim 1 wherein the opening formed in the base member has a frusto-conically shaped surface and wherein the terminal portion of the plug member has a frusto-conically shaped surface extending inwardly from the periphery of the main body portion.

6. An erecting mechanism according to claim 5 wherein the opening formed in the base member further comprises a cylindrically shaped surface extending beneath the frusto-conically shaped surface and wherein the terminal portion of the plug member further comprises a cylindrically shaped surface extending from the frusto-conically shaped surface for engaging the cylindrically shaped surface of the opening in a frictional locking relationship.

References Cited

UNITED STATES PATENTS

| | | | |
|---|---|---|---|
| 411,027 | 8/1889 | Heindel | 52—227 |
| 1,723,216 | 8/1929 | Stam | 52—227 |
| 2,379,577 | 7/1945 | Harsted | 343—900 |
| 2,388,625 | 11/1945 | Wagenknecht | 343—714 |
| 2,874,812 | 2/1959 | Clevett | 52—227 |
| 2,913,073 | 11/1959 | Wendling | 343—709 |
| 1,402,465 | 1/1922 | Wood | 52—113 |
| 1,443,204 | 1/1923 | Bernstein | 52—113 |
| 1,461,116 | 7/1923 | Griswold | 52—113 |
| 1,877,074 | 9/1932 | Stanziale | 52—113 |
| 2,213,310 | 9/1940 | Gimenez | 52—108 |
| 2,397,151 | 3/1946 | Mitchell | 52—113 |
| 2,524,748 | 10/1950 | Baker | 52—108 |
| 3,295,699 | 1/1967 | Bauernschub | 52—108 |
| 3,312,020 | 4/1967 | Schuster | 52—108 |

FOREIGN PATENTS

| | | |
|---|---|---|
| 1,325,120 | 1963 | France. |
| 531,975 | 1955 | Italy. |
| 99,452 | 1961 | Netherlands. |

HENRY C. SUTHERLAND, *Primary Examiner.*

U.S. Cl. X.R.

343—900; 52—108; 242—54